United States Patent [19]

Lundqvist

[11] E Re. 29,977

[45] Reissued May 1, 1979

[54] SHELVING STRUCTURE

[76] Inventor: Harald Lundqvist, En Quarroz, CH-1807 Bolnay, Switzerland

[21] Appl. No.: 880,989

[22] Filed: Feb. 24, 1978

Related U.S. Patent Documents

Reissue of:

[64] Patent No.: 4,029,025
Issued: Jun. 14, 1977
Appl. No.: 692,769
Filed: Jun. 4, 1976

[30] Foreign Application Priority Data

Jun. 5, 1975 [SE] Sweden ..... 7506452

[51] Int. Cl.[2] ..... A47B 57/16

[52] U.S. Cl. ..... 108/108; 108/107; 108/111; 108/114

[58] Field of Search ..... 108/107-109, 108/111, 114; 211/135, 247, 256

[56] References Cited

U.S. PATENT DOCUMENTS

| | | | |
|---|---|---|---|
| 1,996,518 | 4/1935 | Levene et al. | 108/107 |
| 3,295,902 | 1/1967 | Doutt | 108/109 X |
| 3,490,393 | 1/1970 | Nelson | 108/109 |
| 3,844,231 | 10/1974 | Peacock | 108/107 |

*Primary Examiner*—James C. Mitchell
*Attorney, Agent, or Firm*—Burns, Doane, Swecker & Mathis

[57] ABSTRACT

A shelving structure includes a back wall, two upright side walls, and a plurality of shelves. The leading edges of the side walls have vertical reinforcing channel members mounted thereon. The leading edge of each shelf has a horizontal channel member mounted thereon. Securing hooks connect the ends of the horizontal channel members to the vertical channel members. Elements are provided to keep the back plate pressed against the rear edges of the shelves. The arrangement reinforces the back plate so that a back plate can be employed which otherwise is not sufficiently rigid to support the shelves.

8 Claims, 10 Drawing Figures

SHELVING STRUCTURE

Figure 2:
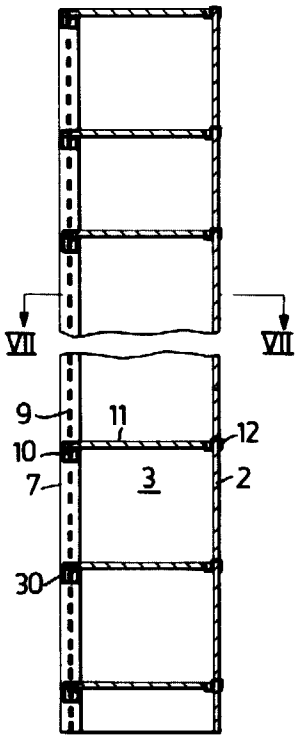

Matter enclosed in heavy brackets [ ] appears in the original patent but forms no part of this reissue specification; matter printed in italics indicates the additions made by reissue.

The present invention relates to shelving structures comprising load supporting side pieces, a back piece and a number of removable shelves which rest on support means arranged in the side pieces, said support means being arranged for vertical movement and being provided with hook-shaped projections for hooking the shelves to said side pieces.

In such shelving, the side pieces normally have a ladder configuration, with the same depth as the shelves; i.e., comprise a forward and a rearward corner post which are mutually connected by means of two or more cross members. The front and rear edge surfaces of the shelves are supported on the corner posts with the aid of suspension and connecting means, which vary with different shelving constructions. Shelvings thus constructed are provided with a back plate which serves to support the shelving laterally and to protect goods placed thereon, or in the case of so-called double shelving, to separate the goods from each other in the two shelvings.

The back plate is not readily assembled, but must be attached with screws or nails, which is a time consuming task. In the case of double shelvings it is also necessary to fasten the two opposing shelvings together, which does not always result in the requisite stability, especially in the case of mobile shelving. When the outer surfaces of the shelving are visible to the eye, it is desirable to hide the joints between the two shelvings.

In the case of single shelving it is necessary to limit the movability of the shelves by nailing or screwing the back plate to at least one of the shelves, since otherwise the back plate would be pressed outwardly from the shelves by the goods placed thereon.

The shelves of particularly wide shelving tend to bow downwardly even when subjected to nominal loads.

An object of the present invention is to provide an improved shelving construction in which all parts, including the back plate, are of simple construction, reliable and readily assembled, and in which the requisite resistance to bending forces is obtained with shelves containing the least possible material.

This object is achieved in accordance with the invention with the shelving construction having the features disclosed in the accompanying claims. The rear portion of the shelves has been given increased supportability by making the back plate load supporting and by providing the same with vertically movable support means for the shelves. The material from which the shelves are made is calculated on the basis of the load-bearing span of the shelving and the loads to which the shelves are to be subjected. At the front edge of the shelf, where the load-bearing span is equal to the length of the shelf, there is provided a reinforcing means having the requisite supportability.

The economic length of the shelves is determined by the cost for several side pieces in the case of short shelves and the need of a stronger material in the case of longer shelves. It is expensive to exceed the economic length of a shelf, since the tendency of the shelves to bow downwardly increases practically in proportion to the square of the shelf length. This rule also applies to the invention, although to a lesser extent, since it is only at the forward portion of the shelf that the bearing span increases. When calculated in shelf meters, the cost for the shelf and the back plate together with its support means remains unchanged with long shelves, and it is only the reinforcing means which has a higher price per meter for long shelves. The fact that the shelf reinforcing member is a separate unit whose mechanical strength can be increased by increasing the depth or thickness thereof, provides the technical prerequisites for long shelves, even though the additional cost for the reinforcing member finally exceeds any saving which is bound to be made in the use of fewer side pieces.

One important factor with respect to shelves in general and to long shelves in particular is their weight. Shelving constructions according to the invention are lighter than other known shelving constructions capable of supporting the same weight, if constructions which are not made of a truly economic material, such as aluminum, are ignored. The weight of a shelving construction has particular significance in respect of its transportation and assembly.

The support means arranged on the back plate conveniently have a downwardly-directed support arm on each respective side of said plate, the lower portion of the support arm on one or both sides being bent to form an outwardly directed support arm. The downwardly directed support arms are received in recesses made on the rear edge portion of the shelf, thereby to prevent lateral displacement between the shelf and the back plate. At least in the case of simple shelving, with which the back plate is not supported on both sides by shelves, it may be convenient to provide the outwardly directed support arms of the bearing means with upwardly extending hooks or the like which project into recesses arranged in the under surface of the shelf, thereby to bind the back plate to the shelf. These recesses may be made so that they also prevent lateral movement between the back plate and the back piece and thus replace the recesses made in the back edge of the shelf for receiving the downwardly directed support arms of the support means. The technical effect afforded by each of these devices is that two shelves arranged one above the other and each having two laterally spaced points of attachment to the back plate, support the shelving structure diagonally. Since each shelf is secured to the back plate and since each shelf has a plurality of attachment points there is obtained not only a marked diagonal reinforcing of the shelf structure but also diagonal supporting of the back plate, thereby enabling the back plate to be made from a particularly thin material and to be divided into separate parts which permit comfortable handling and transportation. The back plate is divided vertically and the joint edges are made V-shaped so as to support each other throughout their thickness and maybe provided with at least one peg to prevent lateral movement.

Downward bending of the front edge of the shelf is counteracted partly by the resistance to torsional stresses of the shelf extending outwardly from the straight rear edge of the shelf, and partly by a reinforcing means whose thickness is greater than the thickness of the shelf and which extends along the whole length of the shelf with its end portions resting on a shelf support means arranged on the front edge portion of respective side pieces. The shelf reinforcing means conveniently comprises a sheet-metal member having three horizontal legs, the forward edge portion of the shelf being inserted and clamped between the upper and the intermediate leg, whilst the distance between the intermediate and the lower leg covers the support body on the shelf support means arranged on the front edge portion of the side piece.

The functions of supporting the rear portion of the shelves are fulfilled by the lattice-like connection between the back plate and the shelves, whilst in order to provide diagonal rigidity to the shelving structure it has been possible to form the side pieces without supporting elements at the rear edge portion of the shelves and without providing attachment means for back or diagonal stays. Vertical rails are required only at the front edges of the shelves, and hence in the case of double shelving it is possible to obtain direct connection between the vertical rails present at the vertical edges of the side pieces of double depth.

A side piece constructed in accordance with the invention comprises solely a side panel which has a vertical rail securely clamped on both longitudinal edges thereof and which thus lacks cross members attached to the vertical rails. The vertical rail is conveniently provided with double-folded edge portions which guide the rail parallel to the side panel. The thickness of the side panel is so much smaller than the thickness of the vertical rail that space is provided on both sides for the engagement hooks of the shelf support members. The depth of the vertical rail is suitably such that the spring force created by the bends in the rail is so strong that the rail is held to the side panel with a force such that it does not bend outwardly, despite the fact that, because of its small thickness, it lacks the requisite inherent stiffness in depth.

In the case of mobile shelving structures, the lower portion of the side panel is reinforced with transverse wooden strips arranged from either side thereof. These wooden strips are suitably provided with recesses for accommodating wheels and wheel axes and also to receive a reinforce connection between the bottom shelf in the form of fittings which are attached to the side walls of a base member which the bottom shelf is provided with, said bottom shelf in this instance having a double width. This simple construction, which is enabled by the fact that the width of the side pieces is such as to accommodate double shelves, renders the mobile shelving structure readily assemblable and renders it unnecessary to provide a difficultly-transportable and expensive carriage which would otherwise be required for mobile shelf structures.

The only connection between the shelves and the side pieces is that provided by a shelf bearing means which is removably hooked into the edge portion of the side pieces, said support means penetrating a hole arranged in the shelf reinforcing means, thereby to support the shelf and to connect the side piece thereto, which in practice results in the binding together of the entire shelf structure. Another function fulfilled by the shelf supporting means is that it holds the lattice structure formed by the shelves and the back plate in the correct depth position relative to the side pieces.

The back portion is normally not attached to the side pieces, although simple shelving structures constitute an exception in this case, where the side panel has a vertical rail only on one edge and where the shelf structure could thus be fixed laterally only at the forward edge. In this instance the rear edge of the side panel is provided with a hook-shaped member which engages the back plate and connects it laterally with the side pieces. It should be mentioned in this respect that this function of supporting the connections between the back plate and the shelves diagonally and the function of determining the depth position of the back plate relative to the side pieces is also fulfilled by the shelf support means by their engagement in the vertical rails of the side pieces and the reinforcing means of the shelves.

Figure 3:
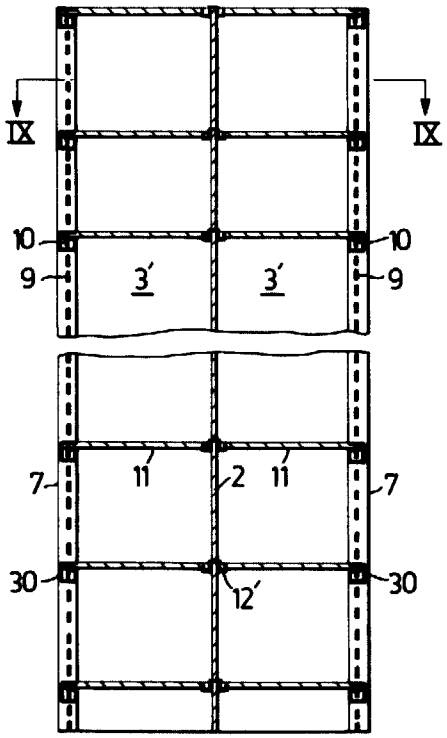
Figure 1:
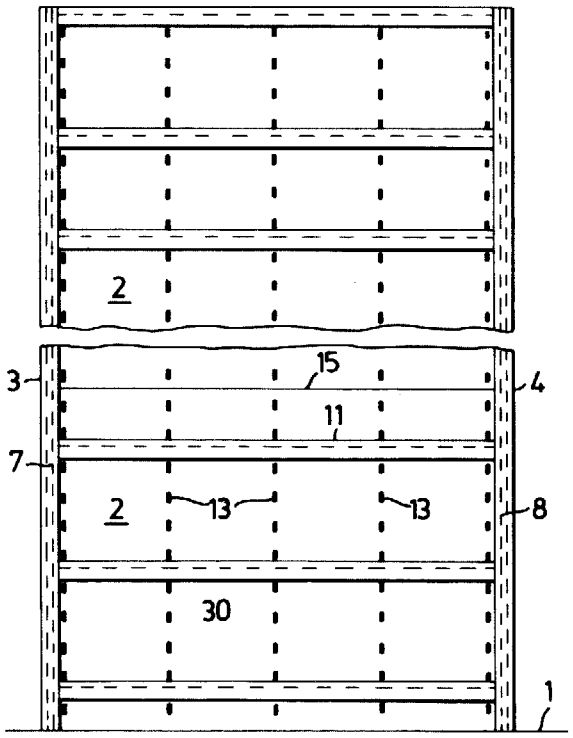
Figure 5:
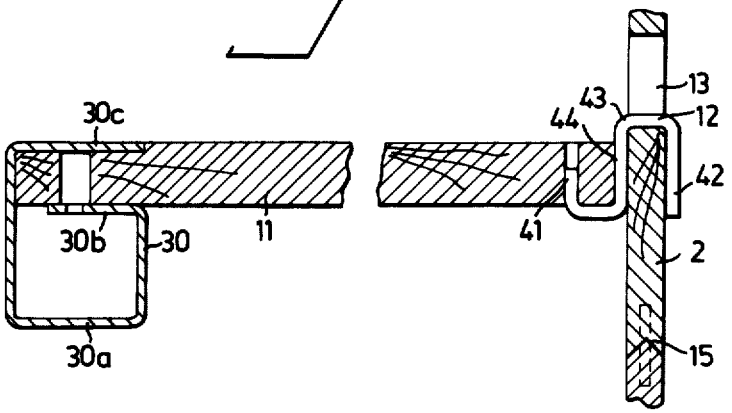
Figure 6A:
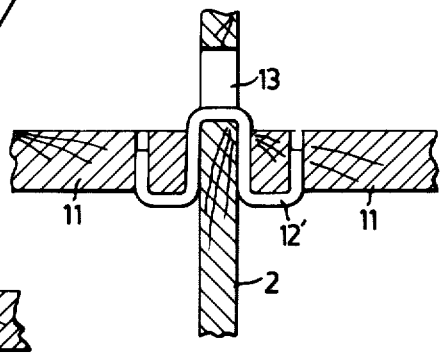
Figure 4:
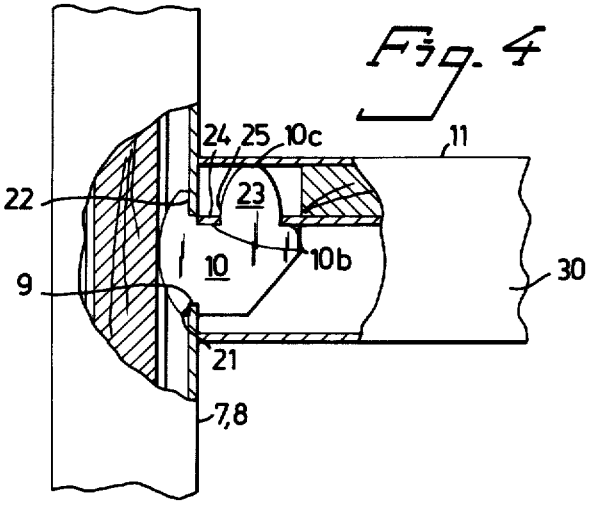
Figure 9:
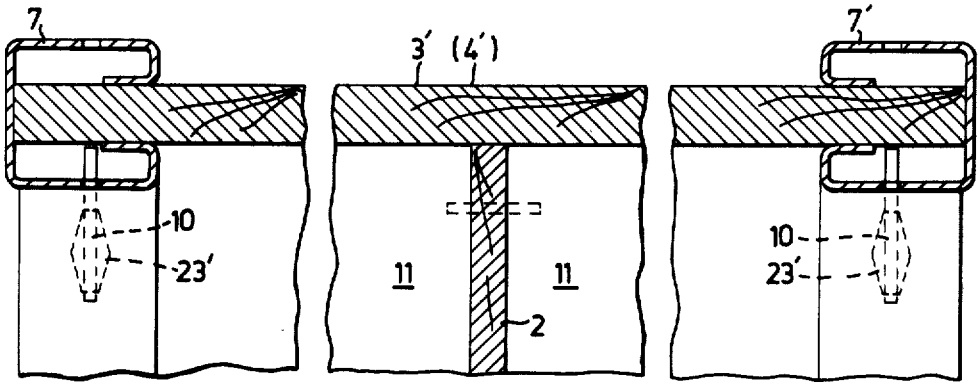
Figure 8:
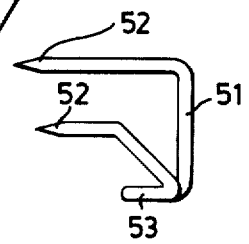
Figure 7:
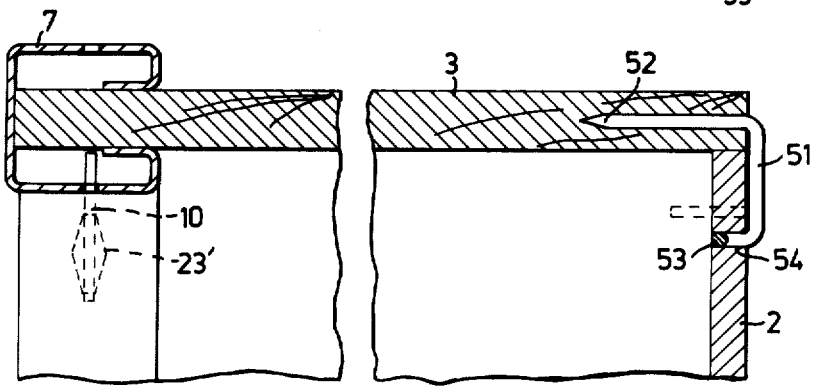

So that the invention will be more readily understood and optional features thereof made apparent, a number of exemplary embodiments will now be described with reference to the accompanying drawings, in which FIG. 1 is a front view of part of a shelving structure according to the invention, FIG. 2 is a cross-sectional view of the shelving structure shown in FIG. 1, FIG. 3 is a cross-sectional view through part of a shelving structure according to the invention, in which shelves are arranged on either side of the back portion, FIG. 4 is a side view of shelf supporting means adapted for mounting in recesses in vertical rails arranged on the front edge portions of the side pieces, FIG. 5 is a cross-sectional view through a shelf having a reinforcing means at the front edge portion of the shelf and a divided back plate having support means arranged therein, FIGS. 6a and b are cross-sectional views through two embodiments of support means arranged in the back plate and intended for two shelves mounted on either side thereof, FIG. 7 is a horizontal sectional view along the line VII—VII in FIG. 2, FIG. 8 is a perspective view of a bracket-type fitting shown in FIG. 7, FIG. 9 is a horizontal sectional view through the line IX—IX in FIG. 3, The shelving structure shown in FIGS. 1 and 2 comprises a load-supporting back plate 2 resting on a foundation 1, and two load-supporting panel-like side pieces, 3, 4, which also rest on the foundation 1.

Each of the front edge portions of the side pieces 3, 4 are embraced by a substantially U-shaped steel profile or channel 7,8, the two legs of which are each provided with a line of recesses 9 in which shelf supporting means, in the form of hooks 10, can be inserted in a known manner. The hooks 10 are effective to receive the ends of the leading edge portions of removable shelves 11, the rear edge portions of which rest on support means in the form of hooks 12 inserted in suitable holes 13 in the back plate 2 and extending into holes arranged on the underside of the shelves so that the shelves are locked against the back plate 2 without any clearance therebetween. The hooks are preferably arranged to extend into recesses in the end of the shelves 11, so that the side-pieces are locked against the end surfaces of the shelves.

With the illustrated embodiment, the back plate is divided approximately centrally thereof in a manner such that the resultant joint obtains a V-shaped cross-section (FIG. 6). To lock the two halves of the back plate together, one or more holes are arranged in one set of mating surfaces of the joint which receive pegs arranged in corresponding mating surfaces of the joint, thereby to lock the portions of the back plate in the longitudinal direction of the joint.

Despite the fact that the side-pieces and the back plate of the shelf structure are interconnected solely through the shelves and the shelf-support means, the shelving structure according to the invention is remarkably stable.

The shelving structure can, to advantage, have the form of a double shelving structure, i.e., with shelves 11 arranged on either side of the back portion 2. The side-pieces in this instance are each provided with two vertical steel profiles 7, 8, for supporting the front edges of the shelves and have means for locking the shelves to the profiles. When the shelves are arranged in pairs at mutually the same height, i.e., in the same horizontal plane, the rear edges of the shelves 11 may be supported on common support means 12' extending through the back plate 2 and beneath the rear edge portions of the shelves located on either side of the back plate 2, and up into holes arranged on the under surfaces of said edge portions.

The hooks 10, capable of being inserted in recesses 9 in the steel profiles 7, 8, suitably have the form shown in FIG. 4. The illustrated hook is inserted into one of the recesses 9 in the steel profiles 7, 8, such that a first recess 21 arranged in the hook 10 engages around the lower edge portion of the recess 9. The hook 10 is provided with a second upper recess 22 which abuts the upper edge portion of said recess 9, thereby preventing lifting of the hook from the illustrated position. A shelf 11, which is held by a tongue 23 on the hook 10, said tongue being completely inserted into a recess 23' in the end of the shelf, can thus be lifted without the hook 10 being lifted and binding against or possibly locking against the edges of the recess in the end of the shelf. Between the upper recess 22 and the tongue 23 there is arranged a further, relatively deep recess 25 which lockingly receives a tongue 24 on the shelf. In order to remove the hook 10 from the recess 9, it is necessary to tilt the hook in a manner such that the relatively deep recess 25 registers with the upper edge portion of said recess 9. This cannot be effected however until the shelf is lifted from the hook 10 and the tongue 24 subsequently removed from the recess 25. The recess 23' for receiving the tongue 23 of the hook has tapering ends so as to provide for play-free locking against the tongue 23 and is made in the ends of a reinforcing means in the form of a channel member 30 of folded steel plate having the cross-sectional form shown in FIG. 5, said reinforcing means having three legs 30a, b, c, arrranged at different distances apart, the shelf 11 being inserted between and clamped by the two upper legs 30b,c. The hooks 10 are each provided with abutment surfaces 10b and 10c which abut the end portions of the legs 30b and 30c, respectively of the reinforcing means 30, whereby the reaction forces from the hooks 10 when the shelves are loaded are distributed to a number of points at the ends of the reinforcing means 30.

Figure 6B:
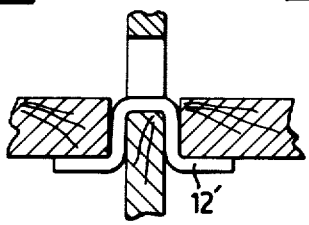

FIG. 5 illustrates an embodiment of the support means 12 shown in FIG. 2. The support means has an S-shaped configuration and is provided with an upwardly directed tongue 41 which engages into a hole arranged in the under surface of the shelf 11, and a downwardly directed tongue 42 which locks the support means against the rear side of the back plate 2. The support means 12 extends with a portion 43, 44 through a suitably elongate hole 13 in the back plate 2 and can be removed subsequent to lifting the support means 12 a distance such that the tongue 42 is located in the elongate hole 13. When the shelf structure is provided with shelves 11 on both sides of the back plate 2, as shown in FIG. 3, the support means 12' has the form shown in FIG. 6a when two shelves 11 are located at mutually the same height. Alternatively, the support means 12' may be formed without the upwardly extending hooks, as shown in FIG. 6b.

In order to hold the side-pieces 3, 4 pressed against the side edges of the back plate 2, locking fittings 51 shown in FIGS. 7 and 8 can be used. As will be seen more clearly from FIG. 8 the fitting 51 comprises two V-shaped portions 51 which, at one end thereof, are provided with sharp points 52 and at the other end thereof are interconnected by a folded portion 53 which, subsequent to inserting the points 52 into holes in the rear edge of a side-piece 3, 4, project into a hole 54 in the back plate 2.

FIG. 9 shows an embodiment in which the shelving structure is provided with shelves on either wide of the back plate 2 to form a double shelving structure. As will be seen from FIG. 9, the back plate 2 is free standing from the side-pieces 3', 4', and fixedly clamped between the shelves located on either side of the back plate, which shelves in turn are connected without play with the side pieces 3', 4', through steel profiles 7,7' and shelf supporting means 10, which are clamped without play in tapered recesses 23', the tapering ends of which abut the tongues 23 of the hooks 10, as is also shown in FIG. 4.

The side pieces 3', 4', need not necessarily be in the form of panels, but may also be of ladder construction.

Since the side panels constitute a direct connection between the two vertical profiles on each side panel in the case of double-shelf structures, which in turn through connection with the forward edge portions of the shelves provides a connection between a plurality of integral shelf structures and therewith absorb the bending forces which occur, particularly with mobile shelving structures, the advantages afforded by the invention are particularly pronounced in the case of mobile shelving structures.

I claim:

1. A shelving structure comprising two upright side-pieces, a back plate and a plurality of movable shelves each of which comprises a thin sheet whose leading edge is reinforced by a reinforcing means having the form of a generally horizontal sheet-metal channel member mounted on said shelf, the thickness of which channel member is greater than the thickness of the shelf and which is securedly clamped thereto, said shelf being connected to the side pieces at the ends of the sheet-metal channel member and to the back plate at the rear edge portion of the shelf, characterized in that vertical sheet-metal channel members are mounted on leading edges of said side-pieces to laterally reinforce such edges; supporting means connect the ends of said horizontal sheet-metal channel member to said vertical channel members, each supporting means being received in a recess in said horizontal channel member and being arranged for minimum play to resist relative separation between the shelf and the side pieces; means are provided for holding the back plate pressed against the rear edges of the shelves so as to reinforce the back plate by means of the shelves fixed by the vertical sheet-metal channel members of the side pieces, said means imparting to the shelving structure the requisite diagonal rigidity, the rigidity of said back plate being otherwise insufficient to support the trailing edges of the shelves.

2. A shelving structure according to claim 1, characterized in that the means for holding the back plate pressed against the trailing edges of the shelves comprises further shelves arranged on the other side of the back plate, and trailing edges of which further shelves are carried by supporting means removably mounted in said back plate, and the leading corners of which shelves being supported by supporting means arranged in recesses in vertical sheet-metal channel members on the remaining vertical edges of said side pieces whose depth is substantially equal to twice the transverse width of a shelf.

3. A shelving structure according to claim 1, characterized in that the means for holding the back plate pressed against the trailing edges of the shelves comprises a removable supporting means having an upwardly extending hook portion and being removably arranged in recesses in the back plate, said hook portion having a locking peg which projects into a hole in the trailing edge of the shelf.

4. A shelving structure according to claim 2 characterized in that locking means are provided between the back plate and the trailing edge of the shelves on the supporting means are arranged to prevent longitudinal movement of the shelves relative to the back plate.

5. A shelving structure according to claim 1, characterized in that in the case of shelves of relatively large transverse width, the side-pieces are also provided with shelf-supporting means having an upwardly directed locking peg arranged to fix the end of the shelf at one or more points.

6. A shelving structure according to claim 1, characterized in that the horizontal channel member has three horizontal legs arranged at different heights, and the leading edge portion of the shelf is inserted into and clamped between the innermost and the upper leg, and the intermediate leg of the horizontal channel member has arranged therein a recess for receiving said supporting means, said recess having a wide center portion to seize the upper portion of the locking peg of the support means and tapering end edges so that the support means is clamped in a position perpendicular to the side piece, whereby the shelf and also the back plate are fixed in the transverse direction.

7. A shelving structure according to claim 6, characterized in that said supporting means mounted on the side-pieces have at least two abutment surfaces against which the upper and intermediate legs of the horizontal channel member abut.

8. A shelving structure according to claim 1, characterized in that the support means, which are inserted in vertical slots in the side-pieces, have a downwardly directed recess which when engaging the lower defining surface of the slot prevents an oblique positioning of the support members when the shelf is lifted, and an upper shoulder which abuts the upper defining surface of the slot and prevents the support means from being moved from its locking position at the lower defining surface of the slot before the shelf is removed.

* * * * *